United States Patent
Peng et al.

(10) Patent No.: US 8,170,209 B2
(45) Date of Patent: May 1, 2012

(54) EXTENSIBLE DISC PLAYER

(75) Inventors: Yang Peng, Shanghai (CN); Declan Patrick Kelly, Eindhoven (NL); Bei Wang, Shanghai (CN); Dahua He, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 1789 days.

(21) Appl. No.: 10/546,721

(22) PCT Filed: Dec. 4, 2003

(86) PCT No.: PCT/IB03/05689
§ 371 (c)(1),
(2), (4) Date: Apr. 7, 2006

(87) PCT Pub. No.: WO2004/057611
PCT Pub. Date: Jul. 8, 2004

(65) Prior Publication Data
US 2006/0265753 A1 Nov. 23, 2006

(30) Foreign Application Priority Data
Dec. 23, 2002 (CN) .................................. 02 1 59638

(51) Int. Cl.
*H04N 7/167* (2011.01)
(52) U.S. Cl. .......... 380/201; 709/225; 709/203; 726/26; 370/474

(58) Field of Classification Search .................. 709/225, 709/203; 726/26; 370/474
See application file for complete search history.

(56) References Cited

U.S. PATENT DOCUMENTS

| | | | |
|---|---|---|---|
| 6,216,152 B1 * | 4/2001 | Wong et al. | 709/203 |
| 6,647,417 B1 * | 11/2003 | Hunter et al. | 709/225 |
| 6,944,185 B2 * | 9/2005 | Patki et al. | 370/474 |
| 2002/0082730 A1 * | 6/2002 | Capps et al. | 700/94 |

FOREIGN PATENT DOCUMENTS

| | | |
|---|---|---|
| GB | 2332772 A | 6/1999 |
| WO | WO 00/63915 A1 | 10/2000 |
| WO | WO 00/67261 A1 | 11/2000 |
| WO | WO 01/82292 A1 | 11/2001 |

* cited by examiner

*Primary Examiner* — Thanhnga B Truong
*Assistant Examiner* — Angela Holmes

(57) ABSTRACT

The present invention provides an extensible disc player that is upgradeable to play new content types. The player's capability can be extended by downloading an appropriate decoder from a web server via the Internet. In this way, the player can play back contents that it does not originally support. If the content type is unknown, the player will check whether the disc contains a URL for linking to a web site containing an appropriate decoder. If the disc contains the URL, the player will access the web site to download the appropriate decoder. In a similar manner, the capability of a recorder can also be expanded by downloading appropriate encoders from the Internet.

15 Claims, 2 Drawing Sheets

EXTENSIBLE DISC PLAYER

BACKGROUND OF THE INVENTION

The invention relates generally to disc players, and more particularly to disc players upgradeable to play new content types.

Optical discs have been widely used to store various types of media, such as audio, data, video, images, animations, etc., which may be encoded in various formats. For example, MPEG-2, MPEG-4, DivX, and H26.L are used for video, MP3 and SACD for audio, and Flash and SVG for animation. A conventional player typically contains a fixed number of decoders that support only a subset of the content types. As a new content type is introduced in the market, consumers would have to buy new players with decoders that support the new content type in order to play discs with this new format. This is very costly for consumers. They will have to make a difficult decision of whether to purchase the new player now and only to see that it will become obsolete in a matter of a few years or not to buy discs with the new format. If the majority of the consumers decide not to buy discs with the new format, it would severely hinder the acceptance of the new format and thus significantly affect the development of the new optical storage technology.

Therefore, there is a need to provide a player that not only can play existing content types, but also may be upgradeable to play new content types.

SUMMARY OF THE INVENTION

The present invention provides an extensible disc player that is upgradeable to play new content types. The player's capability can be extended by downloading an appropriate decoder from a web server via the Internet. In this way, the player can play back contents that it does not originally support.

According to one embodiment of the invention, an extensible disc player is provided. The player comprises: means for determining a content type of a content object on a disc; means for checking whether the disc contains a URL for linking to a web site containing an appropriate decoder, upon determining that the content type is unknown; and means for accessing the web site to download the appropriate decoder, upon checking that the disc contains the URL.

According to another embodiment of the invention, the player also includes means for pre-storing a default URL list containing links to web sites where pre-selected decoders may be downloaded, and means for checking whether a URL for the content type exists in the default URL list.

According to a further embodiment of the invention, the player further comprises means for accessing the player's manufacturer's web site for searching an appropriate decoder, upon checking that the URL for the content type does not exist in the default URL list.

In accordance with the invention, the capability of a recorder may also be expanded by downloading appropriate encoders.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
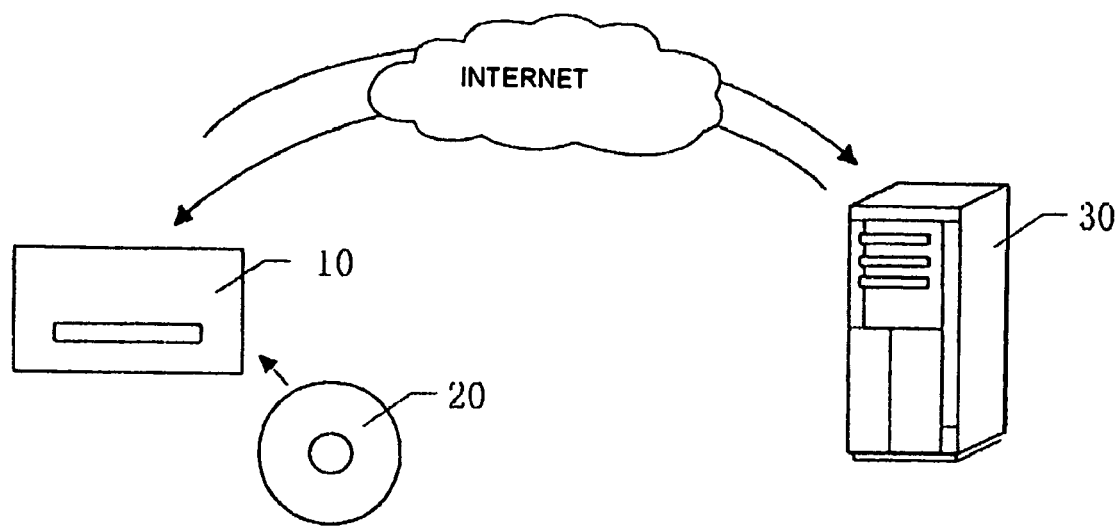
FIG. 1 shows an overview of the operation of an extensible disc player in accordance with one embodiment of the invention.

FIG. 1 shows an overview of the operation of an extensible disc player 10 in accordance with one embodiment of the invention. Player 10 can be connected to the Internet and has the basic protocol stack support for web access (e.g., HTTP protocol stack). When an optical disc 20 is inserted into player 10, the player will attempt to recognize and play back the contents of the disc. If the player cannot handle the content format, it will try to find and download an appropriate decoder from a web server 30 via the Internet. Some basic information about the player and the unsupported content object will be included in a request to web server 30 for finding an appropriate decoder. Such information includes, for example, the player's model number, chipset model number and frequency, OS version, the content type and version, etc. After the decoder is downloaded, it is preferably stored in the player, so that the player does not have to download it again when the same content type is recognized next time. Since the storage space in the player is limited, the player can store only those decoders that were most recently downloaded and are frequently used, so that decoders that are used less frequently can be overwritten. In a similar manner, a user may also change the set of default content types supported by the player by storing pre-selected decoders in the player. The process of obtaining an appropriate decoder is described in more detail below in conjunction with FIG. 2.

Figure 2:
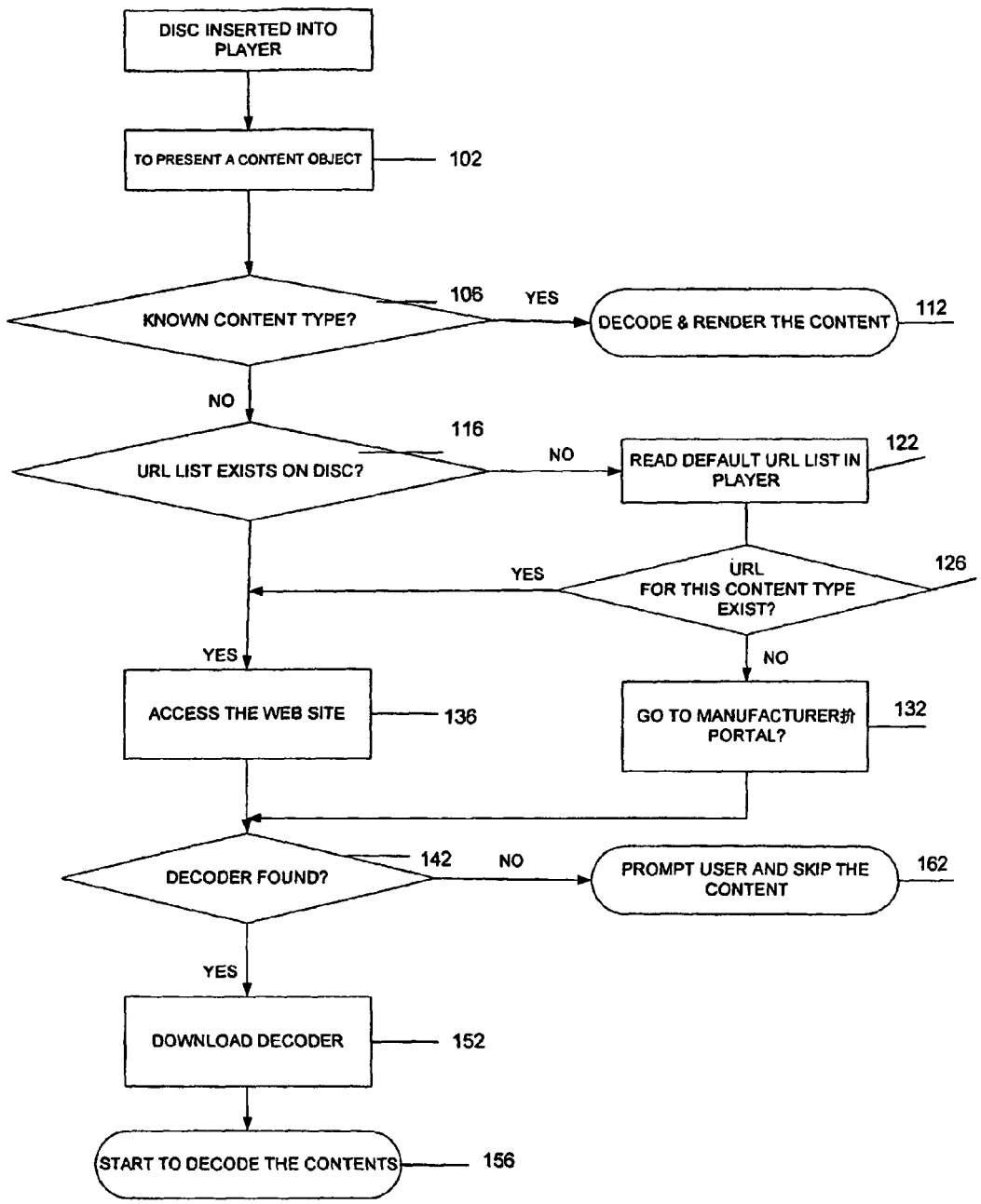
FIG. 2 is a flowchart diagram illustrating a process performed by an extensible disc player for obtaining an appropriate decoder in accordance with one embodiment of the invention.

FIG. 2 is a flowchart diagram illustrating a process 100 performed by extensible disc player 10 for obtaining an appropriate decoder in accordance with one embodiment of the invention. Upon insertion of the disc into the player, the player will try to present a content object on disc (step 102) and determine whether it has a content type known to the player (step 106). This can be achieved in several ways. One way is to read the Table of Contents (TOC) file on the disc to determine the content type. Another way is to use the file extension in the file system of the disc to identify the content type. A third way is to read a content description file associated with the content object, e.g., a XML file that describes the content attributes.

If the content type is known to the player, the player will load and render the content object (step 112). However, if the player does not recognize the content type, it will try to determine whether a URL for linking to a web site containing an appropriate decoder is available on the disc (step 116). If such a URL does not exist on the disc, the player will read a default URL list stored in the player (step 122). The default URL list includes some popular decoder manufacturers' web sites for this particular content type and is updateable. The player will then check whether such a URL is included in the default URL list (step 126). If such a URL does not exist, the player will access the player's manufacturer portal to find an appropriate decoder (step 132). This portal may act as a search engine to allow a user to search for an appropriate decoder, based on certain relevant information such as the player's model number, etc. On the other hand, if, at step 116, it is determined that the URL exists on the disc, the player will use the URL to access the web site (step 136). The player then determines whether the decoder is found (step 142). If it is found, the player will download the decoder (step 152) and then start to render the content object (step 156).

However, if the decoder is not found, the content object is not playable by the player and the player will prompt the user and skip the content object (step 162).

Sometimes in order to play back a content object with a new content type, not only the decoder is needed but also necessary protocol stacks (e.g. new streaming protocols) are required. In such a case, the player can also perform steps similar to the above to download the protocol stacks if they are not on the disc or in the player and run them as plug-in in the player.

Thus, the capability of a playback device, such as a DVD player, can be expanded by downloading appropriate decoder modules. In a similar manner, the capability of a recorder, such as a DVD+RW recorder, can also be expanded by downloading appropriate encoder modules or plug-ins from the Internet. For example, if a user wants to record data contents in the H.26L format in a recorder that does not originally supported the format, a H.26L encoder may be downloaded and used by the recorder.

The principles of the invention can also be used in other types of players that can be connected to the Internet. For examle, DVD players that support MPV (the MultiPhoto Video standard, with more information available from www.osta.org) disc, PhotoCD players, DivX players, MP3 players, etc.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. An extensible disc player, comprising:
   means for determining a content type of a content object on a disc, wherein said content type is determined to be unknown when an appropriate decoder to play said content is determined to be lacking;
   means for checking whether an address is available upon determining that the content type is unknown, wherein said address represents a universal resource locator (URL) of a website containing an appropriate decoder;
   means for downloading the appropriate decoder, upon determining the address is available;
   means for pre-storing a default address list where pre-selected decoders may be downloaded; and
   means for checking whether an address associated with the determined content type exists in the default address list.

2. The player of claim 1, further comprising:
   means for accessing a default website to search for an appropriate decoder, upon checking that the address associated with the content type does not exist in the default address list.

3. The player of claim 2, wherein the accessing means includes means for sending a request to the default website with relevant information regarding the player and the content type.

4. The player of claim 1, further comprising:
   means for determining whether the appropriate decoder is available; and
   means for downloading the decoder upon determining that the appropriate decoder is available.

5. The player of claim 4, further comprising means for:
   notifying a user upon determining that the appropriate decoder is not available.

6. The player of claim 1, further comprising:
   means for enabling a user to manually delete a downloaded decoder.

7. An extensible playback device, comprising:
   means for determining a content type of a content object on a data storage element, wherein said content type is determined to be unknown when said player lacks an appropriate decoder to play said content;
   means for determining whether the storage element contains a URL address for linking to a website containing an appropriate decoder upon determining that the content type is unknown;
   means for downloading the appropriate decoder, upon determining that the storage element contains the address;
   means for pre-storing a default address list containing links to websites where pre-selected decoders may be downloaded; and
   means for checking whether an address for the content type exists in the default address list.

8. The device of claim 7, further comprising:
   means for accessing the player's manufacturer's website to cause the manufacturer's website to search for an appropriate decoder, upon checking that the address for the content type does not exist in the default address list.

9. The device of claim 8, wherein the accessing means includes means for sending a request to the manufacturer's website with relevant information about the device and the content type.

10. A method for upgrading a disc player, comprising:
    determining a content type of a content object on a disc wherein said content type is determined to be unknown when said player lacks an appropriate decoder to play said content;
    checking whether the disc contains a URL address for linking to a website containing an appropriate decoder if the content type is unknown
    downloading the appropriate decoder using the address, if the disc contains the address;
    pre-storing a default address list containing links to websites where pre-selected decoders may be downloaded; and
    checking whether an address for the content type exists in the default address list, if the disc does not contain the address.

11. The method of claim 10, further comprising a step of:
    accessing the player's manufacturer's website to cause the manufacturer's website to search for an appropriate decoder, if the address for the content type does not exist in the default address list.

12. The method of claim 11, wherein the accessing step includes a step for:
    sending a request to the manufacturer's website with relevant information about the player and the content type.

13. The method of claim 10, further comprising:
    determining whether the appropriate decoder is available from the website; and
    downloading the decoder if the appropriate decoder is available.

14. The method of claim 13, further comprising a step of notifying a user if the appropriate decoder is not available from the website.

15. The method of claim 10, further comprising a step of enabling a user to manually delete a downloaded decoder from the player.

* * * * *